United States Patent
Lu et al.

(10) Patent No.: US 11,234,265 B2
(45) Date of Patent: Jan. 25, 2022

(54) DATA TRANSMISSION METHOD AND DEVICE, SEARCH SPACE OPTIMIZATION METHOD AND DEVICE, AND STORAGE MEDIUM

(71) Applicant: XI'AN ZHONGXING NEW SOFTWARE CO., LTD., Shaanxi (CN)

(72) Inventors: Ting Lu, Shenzhen (CN); Bo Dai, Shenzhen (CN); Xiubin Sha, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/652,212

(22) PCT Filed: Oct. 22, 2018

(86) PCT No.: PCT/CN2018/111300

§ 371 (c)(1),
(2) Date: Mar. 30, 2020

(87) PCT Pub. No.: WO2019/063023

PCT Pub. Date: Apr. 4, 2019

(65) Prior Publication Data

US 2020/0252958 A1 Aug. 6, 2020

(30) Foreign Application Priority Data

Sep. 28, 2017 (CN) .......................... 201710901633.3

(51) Int. Cl.
 *H04W 72/14* (2009.01)
 *H04W 72/12* (2009.01)
 *H04W 74/08* (2009.01)

(52) U.S. Cl.
 CPC ....... *H04W 72/14* (2013.01); *H04W 72/1268* (2013.01); *H04W 74/0833* (2013.01)

(58) Field of Classification Search
 CPC ............. H04W 72/14; H04W 72/1268; H04W 74/0833; H04W 72/1294
 See application file for complete search history.

(56) References Cited

U.S. PATENT DOCUMENTS

| 2009/0201868 A1* | 8/2009 | Chun ............... H04W 74/0833 370/329 |
| 2010/0113057 A1* | 5/2010 | Englund ............ H04L 1/0028 455/452.1 |

(Continued)

FOREIGN PATENT DOCUMENTS

| CN | 101873713 A | 10/2010 |
| CN | 103037530 A | 4/2013 |

(Continued)

OTHER PUBLICATIONS

International Search Report and Written Opinion Form PCT/ISA/210 and PCT/ISA237, International Application No. PCT/CN2018/111300, pp. 1-8, International Filing Date Oct. 22, 2018, dated Jan. 11, 2019.

(Continued)

*Primary Examiner* — Dinh Nguyen
(74) *Attorney, Agent, or Firm* — Bond Schoeneck & King, PLLC; George McGuire (57) ABSTRACT

Disclosed are a data transmission method and apparatus, a search space optimization method and apparatus and a storage medium. The data transmission method includes that a UE sends a random access preamble to a base station and receives a random access response sent by the base station, the UE sends a first request message to the base station, and the UE in a first state receives an uplink grant sent by the base station and sends uplink data to the base station by using the uplink grant, where the first state includes an idle state or an inactive state. The UE can transmit uplink data without entering a connected state so that power consumption of the UE is reduced.

15 Claims, 5 Drawing Sheets

(56) References Cited

U.S. PATENT DOCUMENTS

| | | | |
|---|---|---|---|
| 2013/0028204 A1 | 1/2013 | Dinan | |
| 2014/0043990 A1* | 2/2014 | Lin | H04W 24/10 370/252 |
| 2014/0301330 A1* | 10/2014 | Lee | H04W 74/0833 370/329 |
| 2016/0135247 A1* | 5/2016 | Ozturk | H04W 36/0016 455/436 |
| 2017/0237539 A1* | 8/2017 | Xu | H04W 72/0446 370/329 |
| 2017/0273113 A1 | 9/2017 | Tirronen et al. | |

FOREIGN PATENT DOCUMENTS

| | | |
|---|---|---|
| CN | 103095424 A | 5/2013 |
| CN | 103582001 A | 2/2014 |
| CN | 104067640 A | 9/2014 |
| CN | 104185293 A | 12/2014 |
| CN | 104737614 A | 6/2015 |
| CN | 105264999 A | 1/2016 |
| WO | 2011079469 A1 | 7/2011 |
| WO | 2015013976 A1 | 2/2015 |

OTHER PUBLICATIONS

Translated CN Office Action pp. 1-19.
Translated CN Search Report, pp. 1-2.

* cited by examiner

DATA TRANSMISSION METHOD AND DEVICE, SEARCH SPACE OPTIMIZATION METHOD AND DEVICE, AND STORAGE MEDIUM

CROSS-REFERENCE TO RELATED APPLICATION

This is a National stage application, filed under 37 U.S.C. 371, of the International application No. PCT/CN2018/111300, filed on Oct. 22, 2018, which is based on and claims priority to a Chinese patent application No. 201710901633.3 filed on Sep. 28, 2017, disclosures of which are incorporated herein by reference in their entities.

TECHNICAL FIELD

The present disclosure relates to communication technologies and, in particular, to a data transmission method and apparatus, a search space optimization method and apparatus, and a storage medium.

BACKGROUND

In a machine to machine (M2M) communication system, energy saving of a user equipment (UE) is crucial. In the related art, when the UE is in an idle state, for example a RRC_IDLE state, and has data to send, the UE first triggers a random access procedure to establish or recover a radio resource control (RRC) connection with a network, and the UE may send the data to the base station along with an RRC connection setup complete message or an RRC-recovery complete message at the earliest. Then, the UE will remain in a connected state, for example a RRC_CONNECTED state, for a period of time, so as to wait for the base station to release the UE. When the UE is in the RRC_CONNECTED state and has data to send, the UE may need to initiate a random access first since losing time synchronization or having no uplink resource, and send the data to the base station after the random access procedure is completed.

Figure 1:
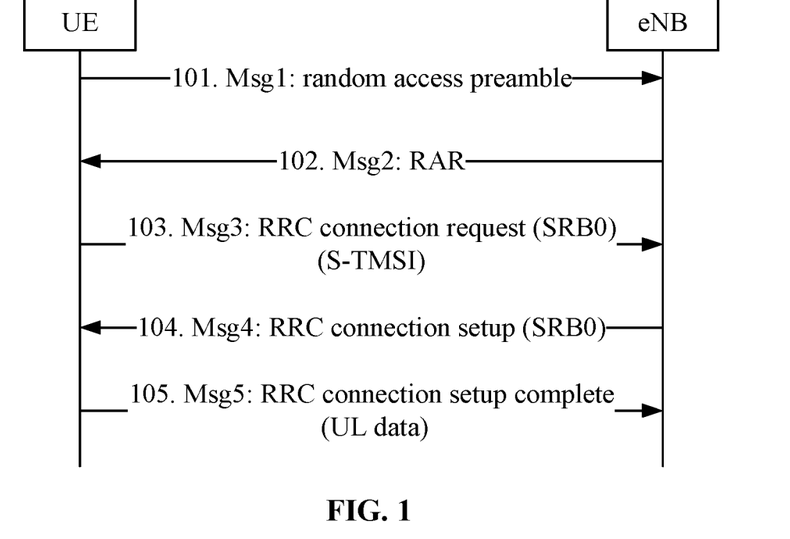
FIG. 1 is a flowchart of a data transmission method in the related art.

As shown in FIG. 1, in the related art, the UE is in the RRC_IDLE state and the data is uploaded by using a control plane (CP) solution after the random access procedure. The process includes the steps described below.

In step 101, the UE sends to the base station eNB a first message Msg1 carrying a random access preamble.

In step 102, the eNB sends to the UE a second message Msg2 carrying a random access response (RAR).

In step 103, the UE to the eNB sends a message Msg3 carrying an RRC connection request and an SAE-temporary mobile subscriber identity (S-TMSI).

In step 104, the eNB sends to the UE a message Msg4 carrying an RRC connection setup (RRCConnectionSetup) message.

In step 105, the UE sends to the eNB a message Msg5 carrying an RRC connection setup complete message and uplink data (UL data).

In a large class of applications such as meter reading traffic, the stationary or low-mobility UE may need to send only one data packet once and there is a long time interval between two data packet transmissions. In this case, the UE sends only one data packet after entering the RRC_CONNECTED state, but needs to remain in the RRC_CONNECTED state for a period of time to continuously monitor a base station signal, causing unnecessary power consumption.

SUMMARY

At least one embodiment of the present disclosure provides a data transmission method and apparatus and a search space optimization method and apparatus, and power consumption of a user equipment is reduced.

To achieve the object of the present disclosure, at least one embodiment of the present disclosure provides a data transmission method. The method includes the steps described below.

A UE sends a random access preamble to a base station and receives a random access response sent by the base station.

The UE sends a first request message to the base station.

The UE in a first state receives an uplink grant sent by the base station and sends uplink data to the base station by using the uplink grant, where the first state includes an idle state or an inactive state.

An embodiment of the present disclosure provides a data transmission apparatus. The apparatus includes a memory and a processor, where the memory stores a program and the program, when read and executed by the processor, performs the preceding data transmission method.

An embodiment of the present disclosure provides a storage medium. The storage medium stores one or more programs executable by one or more processors to perform a search space optimization method executed by the UE described above.

An embodiment of the present disclosure provides a data transmission method. The method includes the steps described below.

A base station receives a random access preamble sent by a UE and sends a random access response to the UE.

The base station receives a first request message sent by the UE.

The base station sends an uplink grant to the UE in a first state and receives uplink data sent by the UE by using the uplink grant, where the first state includes an idle state or an inactive state.

An embodiment of the present disclosure provides a data transmission apparatus. The apparatus includes a memory and a processor, where the memory stores a program, and the program, when read and executed by the processor, performs the preceding data transmission method.

An embodiment of the present disclosure provides a storage medium. The storage medium stores one or more programs executable by one or more processors to perform a search space optimization method executed by the base station described above.

An embodiment of the present disclosure provides a data transmission method. The method includes the steps described below.

A UE receives multiple common search spaces configured by a base station.

In a case where a preset condition is satisfied, the UE switches between the multiple common search spaces.

An embodiment of the present disclosure provides a search space optimization apparatus. The apparatus includes a memory and a processor, where the memory stores a program and the program, when read and executed by the processor, performs the preceding search space optimization method.

An embodiment of the present disclosure provides a data transmission method. The method includes the steps described below.

A base station receives a random access preamble sent by a UE.

The base station sends a random access response to the UE. The random access response carries a media access control protocol data unit, the media access control protocol data unit includes a media access control header, one or more media access control random access responses and one or more new media access control random access responses in one-to-one correspondence with the one or more media access control random access responses. Each new media access control random access response carries uplink grant information for uplink data transmission, and the resource position of the uplink grant information carried in each new media access control random access response at least partially overlaps with the resource position of the uplink grant information carried in the corresponding media access control random access response.

The base station receives a first request message sent by the UE, where the first request message carries uplink data.

An embodiment of the present disclosure provides a data transmission apparatus. The apparatus includes a memory and a processor, where the memory stores a program and the program, when read and executed by the processor, performs the preceding data transmission method.

An embodiment of the present disclosure provides a data transmission method. The method includes the steps described below.

A UE send a random access preamble to a base station.

The UE receives a random access response sent by the base station. The random access response carries a media access control protocol data unit, and the media access control protocol data unit includes a media access control header, one or more media access control random access responses and one or more new media access control random access responses in one-to-one correspondence with the one or more media access control random access responses. Each new media access control random access response carries uplink grant information for uplink data transmission, and the resource location of the uplink grant information carried in each new media access control random access response at least partially overlaps with the resource location of the uplink grant information carried in the corresponding media access control random access response.

After the UE obtains a matched media access control random access response according to a random access radio network temporary identifier, the UE obtains a new media access control random access response corresponding to the matched media access control random access response and obtains an uplink grant from the new media access control random access response.

The UE uses the uplink grant to send a first request message carrying the uplink data.

An embodiment of the present disclosure provides a data transmission apparatus. The apparatus includes a memory and a processor, where the memory stores a program and the program, when read and executed by the processor, performs the preceding data transmission method.

An embodiment of the present disclosure further provides a storage medium. The storage medium stores a computer program, and when the computer program is executed by a processor, the steps of a search space optimization method are performed.

Compared with the related art, in the present application, the base station sends the uplink grant to the UE in the idle state or the inactive state, and the UE uses the uplink grant to send the uplink data to the base station without entering a connected state or monitoring a base station signal, so that power consumption of the UE is reduced.

Additional features and advantages of the preset disclosure will be set forth in the following description, and will be in part apparent from the description, or may be understood through the implementation of the present disclosure. The objects and other advantages of the present disclosure can be achieved and obtained through the structures especially indicated in the description, claims and drawings.

BRIEF DESCRIPTION OF DRAWINGS

The drawings are used to provide a further understanding of the technical solutions of the present disclosure, constitute a part of the specification, explain the technical solutions of the present disclosure in conjunction with the embodiments of the present application, and do not limit the technical solutions of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

The steps illustrated in the flowcharts in the drawings may be performed by a computer system such as a group of computers capable of executing instructions. Further, although logical sequences are illustrated in the flowcharts, the shown or described steps may be performed in sequences different from those described herein in some cases.

Figure 2:
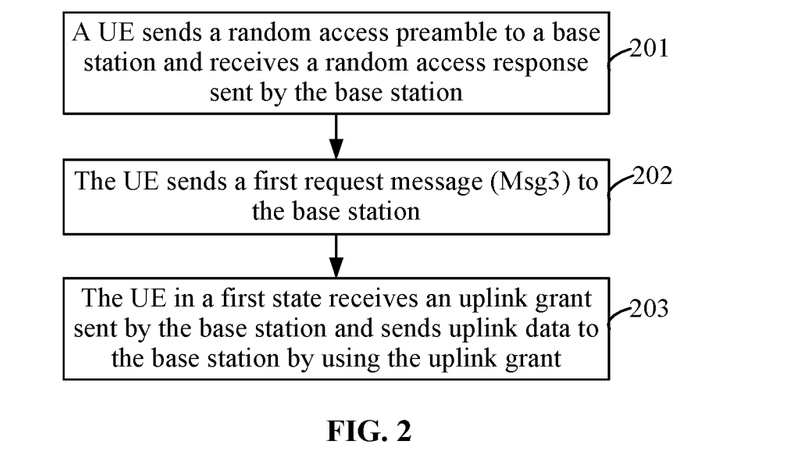
FIG. 2 is a flowchart of a data transmission method according to an embodiment of the present disclosure.

An embodiment of the present disclosure provides a data transmission method. As shown in FIG. 2, the method includes the steps described below.

In step 201, an UE sends a random access preamble to a base station and receives a random access response sent by the base station.

In step 202, the UE sends a first request message Msg3 to the base station.

In step 203, the UE in a first state receives an uplink grant (UL grant) sent by the base station and sends uplink data to the base station by using the uplink grant, where the first state includes an idle state or an inactive state.

In an embodiment, the first request message carries at least one of an indication about whether to switch a state, an indication that uplink data is to be sent, or an indication about whether to support a data transmission function in the first state. The indication about whether to switch a state is configured to indicate whether the base station or the UE needs to switch to a connected state, and the indication that the uplink data is to be sent is configured to indicate that the base station or the UE needs to send the uplink data.

In an embodiment, before the UE in the idle state receives the UL grant sent by the base station, the UE receives a second response message Msg4 returned by the base station. In another embodiment, after the UE determines that conflict resolution is successfully resolved according to the second response message, the UE remains in the idle state and uses a temporary cell radio network temporary identifier (T-RNTI) as a cell radio network temporary identifier (C-RNTI), where the temporary cell radio network temporary identifier is allocated by the base station and carried in the random access response.

In an embodiment, the second response message includes at least one of resource configuration information or search space configuration information of the uplink grant corresponding to the uplink data detected by the UE. The resource configuration information includes at least one of cell configuration information or physical resource block (PRB) configuration information. The PRB configuration information may include non-anchor PRB configuration information. The UE detects at least one of the uplink grant or a downlink grant according to at least one of the received resource configuration information or the received search space configuration information of the uplink grant.

In an embodiment, the step of sending the unlink data to the base station by using the UL grant includes the steps described below.

When the UE is in the first state, receives the uplink grant sent by the base station and sends the uplink data to the base station by using the uplink grant, if the UE has no uplink data to be sent, then an indication that no data to be sent exists is carried (for example, the information that BSR=0 is carried) when the UE sends the uplink data; if the UE still has the uplink data to be sent, then the indication that the uplink data is to be sent is carried (for example, non-zero buffer status report (BSR) information is carried) when the UE sends the uplink data, and the UE receives the uplink grant sent by the base station and continues sending the uplink data to the base station until the data to be sent is sent completely.

In an embodiment, the method further includes that after the UE confirms that the base station receives a last uplink data packet sent by the UE, the UE releases the cell radio network temporary identifier.

In an embodiment, the method further includes that after the UE confirms that the base station receives a last uplink data packet sent by the UE, if the UE is monitoring a common search space having a shorter monitoring interval, then the UE switches back to a common search space having a longer monitoring interval.

In an embodiment, the UE confirms, according to at least one of the conditions described below, that the base station receives the last uplink data packet sent by the UE.

The UE fails to receive a uplink grant for retransmission sent by the base station within a preset time.

The UE receives information about acknowledge receipt of the last uplink data packet sent by the UE, where the information is sent by the base station.

In an embodiment, before the UE sends the unlink data to the base station by using the UL grant, the method further includes the step described below.

Whether the uplink grant is used for new transmission or retransmission is determined. If the uplink grant is used for the new transmission, then the UE uses the uplink grant to send new uplink data to be transmitted; and if the uplink grant is used for the retransmission, then the UE uses the uplink grant to retransmit the uplink data sent before. Here, "before" refers to "before receiving the uplink grant".

It is to be noted that if the content sent before is a message instead of the uplink data, then the UE uses the uplink grant to retransmit the message sent before.

In an embodiment, the UE determines, in one of the manners described below, whether the uplink grant is used for the new transmission or the retransmission.

Whether the uplink grant is used for the new transmission or the retransmission is determined according to a new physical-layer format indication used when the base station sends the uplink grant.

Whether the uplink grant is used for the new transmission or the retransmission is determined according to indication information carried when the base station sends the uplink grant. For example, if the indication information is a new transmission indication, then the uplink grant is used for the new transmission; and if the indication information is a retransmission indication, then the uplink grant is used for the retransmission.

In an embodiment, after the UE sends the unlink data to the base station by using the UL grant, the method further includes the step described below.

The UE receives the Msg4 returned by the base station.

Figure 3:
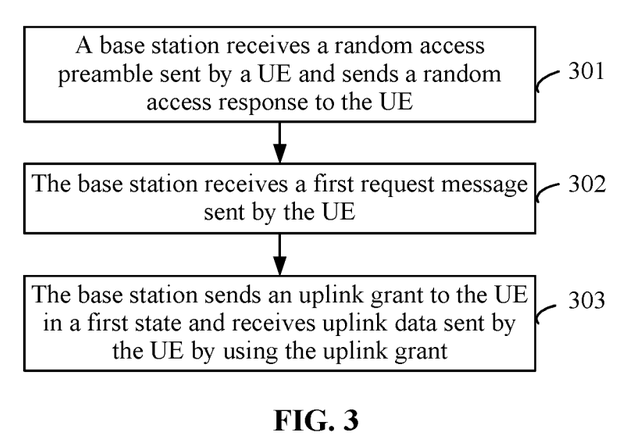
FIG. 3 is a flowchart of a data transmission method according to another embodiment of the present disclosure.

An embodiment of the present disclosure provides a data transmission method. As shown in FIG. 3, the method includes the steps described below.

In step 301, a base station receives a random access preamble sent by a UE and sends a random access response to the UE.

In step 302, the base station receives a first request message sent by the UE.

In step 303, the base station sends an uplink grant to the UE in a first state and receives uplink data sent by the UE by using the uplink grant, where the first state includes an idle state or an inactive state.

The first request message carries at least one of an indication about whether to switch a state, an indication that uplink data is to be sent, or an indication about whether to support a data transmission function in the first state.

After the base station receives the first request message, when the first request message carries the indication that the uplink data is to be sent, the base station sends the uplink grant to the UE in the idle state.

In an embodiment, before the base station sends the uplink grant to the UE in the idle state, the method includes that the base station sends a message Msg4 to the UE. The message Msg4 may carry only a collision resolution ID, and compared with that in the related art, the message Msg4 does not need to carry related information of an RRC connection setup.

In an embodiment, the method further includes that the uplink data and the indication that no data to be sent exists sent by the UE is received by the base station, and the base station sends to the UE information about acknowledge receipt of the last uplink data packet sent by the UE.

In another embodiment, the step in which the base station sends the uplink grant to the UE in the first state includes the step described below.

The base station sends to the UE in the first state the uplink grant, which carries indication information about whether the uplink grant is used for new transmission or retransmission.

In another embodiment, the method further includes that after the base station receives the uplink data and the indication that no data to be sent exists sent by the UE, the base station sends the message Msg4 to the UE. That is, the base station sends the message Msg4 after the UE uploads the uplink data. Unlike in the preceding embodiment, in this embodiment, after the base station sends the message Msg4, the UE performs data transmission.

The present application is further described through the examples described below. In the embodiments described below, a description is given using an example in which the base station is an eNB, but the present application is not limited to the eNB but applicable to other types of base stations. In the embodiments described below, the description is given using an example in which the UE is in the idle state, but the present application is also applicable to the UE in the inactive state.

Embodiment One

In this embodiment, a UE in an idle state transmits uplink data after the UE receives a message Msg4. An indication about whether to switch a state and/or an indication that uplink data is to be sent is included in a first request message Msg3 sent by the UE in a random access procedure. After the UE receives a conflict resolution ID of a base station and determines that conflict resolution is successful, the UE remains in a RRC_IDLE state and reserves a C-RNTI for a period of time. The UE receives a UL grant of the base station and sends the uplink data by using the UL grant. When the UE completes transmission of the data in a buffer area, an indication that no data to be sent exists may be carried and sent to the base station while the UE sends the last uplink data packet. When the UE confirms that the base station receives the last uplink data packet, the UE releases the C-RNTI.

Figure 4:
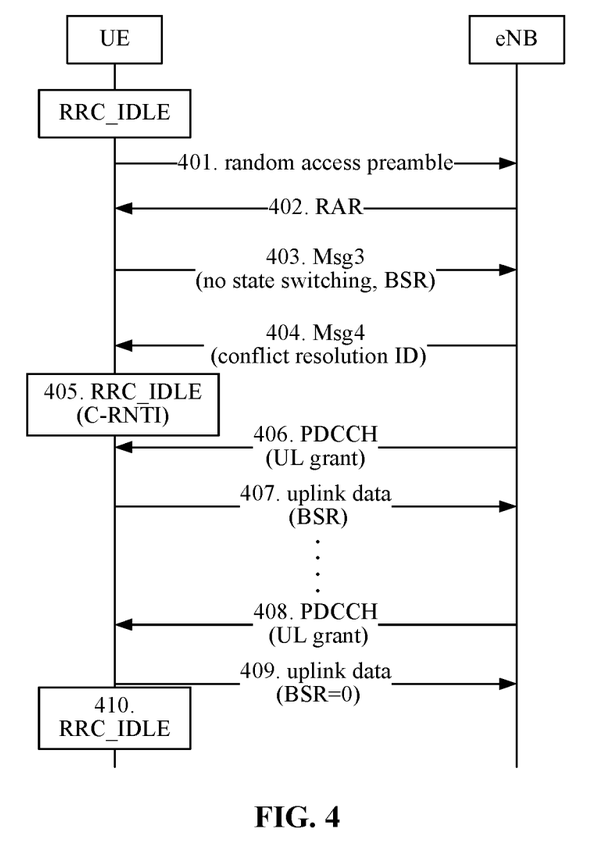
FIG. 4 is a flowchart of a data transmission method according to another embodiment of the present disclosure.

As shown in FIG. 4, the data transmission method provided by this embodiment includes the steps described below.

In step 401, the UE sends a random access preamble to the eNB.

In step 402, the eNB sends a random access response to the UE.

In step 403, the UE sends the first request message Msg3 to the eNB and the Msg3 carries the indication about whether to switch a state and/or the indication that the uplink data is to be sent.

The Msg3 may only carry the indication about whether to switch a state, or may only carry the indication that the uplink data is to be sent, or may carry both the indication about whether to switch a state and the indication that the uplink data is to be sent.

The indication that the uplink data is to be sent may be extended on the basis of an existing BSR MAC control element (CE) or may be newly defined.

The indication about whether to switch a state may be indicated with a field, a bit in the field, or the like, where the field may be an existing field or a newly defined field.

In step 404, after the eNB receives the Msg3, the eNB sends the Msg4 to the UE.

If indication information carried in the Msg3 indicates that the UE will not switch a state (that is, the Msg3 carries the indication information that a state is not to be switched), then the eNB may make the Msg 4 include only the collision resolution ID. Certainly, other information may be included.

If the indication information carried in the Msg3 indicates that the UE needs to send the uplink data (that is, the Msg3 carries the indication that the uplink data is to be sent), then the UL grant needs to be allocated to the UE.

In step 405, after the UE receives the message Msg4 and determines that the conflict resolution is successful according to the conflict resolution ID, the UE remains in the idle state and reserves the C-RNTI information.

In step 406, when the Msg3 carries the indication that the uplink data is to be sent, the eNB sends the UL grant to the UE.

In step 407, the UE sends the uplink data by using the UL grant, and if there is still the data to be sent in the UE buffer, then the UE may carry a BSR request while the UE sends the uplink data.

In step 408, the eNB sends the UL grant to the UE.

The eNB allocates the UL grant to the UE through a physical downlink control channel (PDCCH).

In step 409, the UE sends the last data packet.

The information that BSR=0 may be carried while the last data packet is sent.

In step 410, after the UE confirms that the eNB receives the last data packet and the information that BSR=0, the UE releases the C-RNTI and enters a common RRC_IDLE state.

The UE may confirm whether the eNB receives the last data packet in the manners described below.

The UE uses an existing timer-based mode. That is, if the UE does not receive the UL grant for retransmission within a preset time, then the UE determines that the uplink data is successfully sent.

Alternatively, the UE receives explicit acknowledgement information for uplink data transmission sent by the eNB, and the acknowledgement information may be transmitted through downlink control information (DCI), an MAC CE or other forms.

After the base station receives the uplink data packet and the information that BSR=0, the base station also releases the C-RNTI.

It is to be noted that in the preceding embodiment, the steps described below may be performed for multiple times between step 407 and step 408.

The eNB sends the UL grant to the UE.

The UE sends the uplink data by using the UL grant, and if there is still the data to be sent in the UE buffer, then the UE may carry the BSR request while sending the uplink data.

Additionally, in another embodiment, in step 407, if the UE sends the uplink data by using the UL grant and there is no data to be sent in the UE buffer, the UE carries the information that BSR=0 when the UE sends the uplink data and then performs step 410.

It is be noted that in other embodiments, the indication that data is to be sent may not be carried in the Msg3 but is sent to the eNB when the UE receives the Msg4 and has data to be sent.

It is to be noted that if the Msg3 carries the indication information to switch a state, the subsequent process is performed according to the existing random access procedure.

Embodiment Two

In this embodiment, a UE in an idle state transmits uplink data before the UE receives a message Msg4. An indication about whether to switch a state and/or an indication that uplink data is to be sent is included in a first request message Msg3 sent by the UE in a random access procedure. After the base station receives the indication, the base station allocates a UL grant to the UE through a PDCCH. If the PDCCH includes a retransmission indication, then the UE retransmits the Msg3 according to an existing mechanism; and if the PDCCH includes a new transmission indication, then the UE sends the uplink data by using the UL grant. When transmission of the data in a UE buffer is completed, an indication that no data to be sent exists may be carried and sent to the base station while the UE sends the last uplink data packet. After the base station receives the data packet and the indication that no data to be sent exists, the base station sends the Msg4 to the UE. After the UE receives a conflict resolution ID carried in the Msg4 and determines that conflict resolution is successful, then the UE determines that the uplink data is successfully sent. In the preceding process, the UE needs to set a longer conflict resolution timer.

Figure 5:
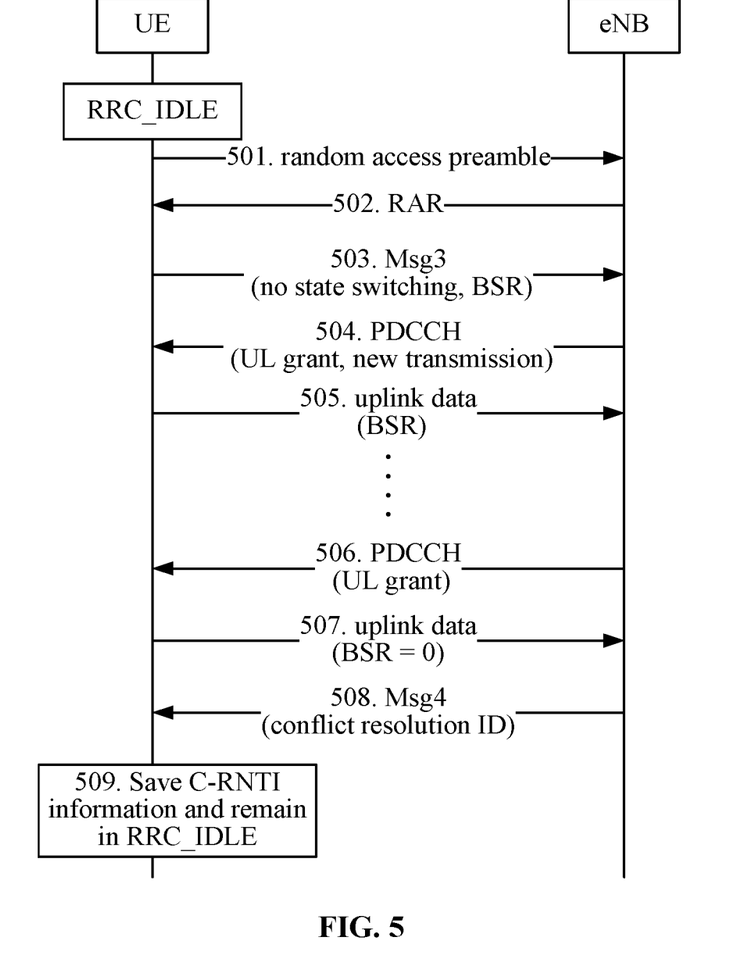
FIG. 5 is a flowchart of a data transmission method according to another embodiment of the present disclosure.

As shown in FIG. 5, the data transmission method provided by this embodiment includes the steps described below.

In step 501, the UE sends a random access preamble to the eNB.

In step 502, the eNB sends a random access response to the UE.

In step 503, the UE sends the first request message Msg3 to the eNB and the Msg3 carries the indication about whether to switch a state and/or the indication that the uplink data is to be sent.

The indication that the uplink data is to be sent may be extended on the basis of an existing BSR MAC CE or may be newly defined.

In step 504, after the base station receives the Msg3, if the Msg3 indicates that the UE is not to switch a state or establish an RRC connection, then the base station sends the PDCCH to allocate the UL grant to the UE, where the PDCCH includes the retransmission indication or the new transmission indication.

In this embodiment, the PDCCH includes the new transmission indication.

In step 505, the UE receives the PDCCH and obtains the UL grant from the PDCCK; if the PDCCH includes the retransmission indication, then the UE retransmits the Msg3 according to the existing mechanism; and if the PDCCH includes the new transmission indication, then the UE sends the uplink data by using the UL grant.

In this embodiment, the PDCCH includes the new transmission indication and the UE uses the UL grant to send the uplink data.

Additionally, the UE may determine whether the UL grant is used for the retransmission or the new transmission according to the size of the UL grant. For example, if the UL grant from the PDCCK is greater than the UL grant used for message transmission in length, then the UE may regard the UL grant from the PDCCK to be used for the new transmission of the uplink data. Certainly, this is only an example, and the base station may use other modes to implicitly indicate whether the UL grant is used for the retransmission or the new transmission.

Additionally, the UE may determine whether the uplink grant is used for the new transmission or the retransmission according to a new physical-layer format indication (for example, downlink control information (DCI)) used when the base station sends the uplink grant.

If there is still the data to be sent in the UE buffer, then a BSR request may be carried in the uplink data when the UE transmits the uplink data. When the UE transmits the uplink data, the uplink data may be regarded as a new "Msg3", and the retransmission indication or the new transmission indication included in the subsequent PDCCH may be used as an acknowledgement for the uplink data. For example, if the PDCCH includes the retransmission indication, then the "Msg3", that is, the uplink data transmitted before, is instructed to be retransmitted; and otherwise, the UE continues to transmit the next new data in the buffer.

In step 506, the base station sends the PDCCH to allocate the UL grant to the UE and the PDCCH includes the retransmission indication or the new transmission indication.

In step 507, information that BSR=0 may be carried in the last data packet while the UE sends the last data packet.

In step 508, after the base station receives the uplink data packet and the information that BSR=0, the base station sends the Msg4 to the UE.

In an embodiment, the Msg4 only includes the conflict resolution ID.

In step 509, after the UE receives the Msg4 and determines that the conflict resolution is successful resolved according to the conflict resolution ID, the UE saves C-RNTI information and remains in the RRC_IDLE state.

It is to be noted that the process in which the base station delivers the UL grant and the UE uses the delivered UL grant to upload the uplink data may be performed multiple times between step 505 and step 506. Additionally, in another embodiment, if in step 505, the UE sends the uplink data by using the UL grant and there is no data to be sent in the UE buffer, the information that BSR=0 is carried in the uplink data when the UE sends the uplink data and then step 508 is performed.

Embodiment Three

In this embodiment, a base station configures multiple common search spaces for a UE through system messages. These common search spaces have monitoring intervals of different lengths, and starting positions and repetition quantities of these common search spaces may be the same or different.

Figure 6:
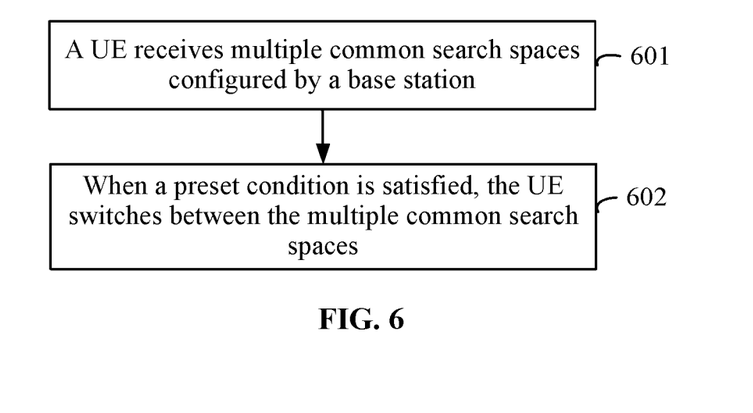
FIG. 6 is a flowchart of a search space optimization method according to another embodiment of the present disclosure.

This embodiment provides a search space optimization method. As shown in FIG. 6, the method includes the steps described below.

In step 601, the UE receives multiple common search spaces configured by the base station.

In step 602, when a preset condition is satisfied, the UE switches between the multiple common search spaces.

In an embodiment, the multiple common search spaces are not completely uniform in monitoring interval.

In an embodiment, satisfying the preset condition includes satisfying at least one of the conditions described below.

The UE receives an indication for supporting earlier data transmission sent by the base station.

The UE receives a greater UL grant in a second message Msg2, that is, receives an uplink grant for uplink data transmission.

The UE receives a new transmission indication after the UE sends an Msg3.

The UE receives the greater UL grant after the UE sends the message Msg3, that is, receives the uplink grant for the uplink data transmission.

The UE remains in a RRC_IDLE state and sends the uplink data after the UE receives an Msg4.

It should be noted that the preceding preset condition is just an example and other conditions may be set as needed.

The UE switches between different common search spaces, for example, from a common search space having a longer monitoring interval to a common search space having a shorter monitoring interval. For example, when the UE confirms that the last uplink data packet is received by the base station, if the UE is monitoring the common search space having the short monitoring interval, then the UE may switch back to the common search space with the long monitoring interval.

An embodiment of the present disclosure provides a search space optimization apparatus. The apparatus includes a memory and a processor, where the memory stores a program and the program, when read and executed by the processor, performs the preceding search space optimization method described in this embodiment.

An embodiment of the present disclosure provides a storage medium. The storage medium stores one or more programs executable by one or more processors to perform the preceding search space optimization method described in this embodiment.

Embodiment Four

A method for sending traffic data is proposed in the related art. In a random access procedure, a UE transmits uplink data through an Msg3, and then the UE receives a conflict resolution identifier (ID) carried in an Msg4 and determines that conflict resolution is successful resolved. Thus, the UE regards that the uplink data is successfully sent, and the UE remains in an RRC_IDLE state and reserves a C-RNTI for a period of time.

Figure 7:
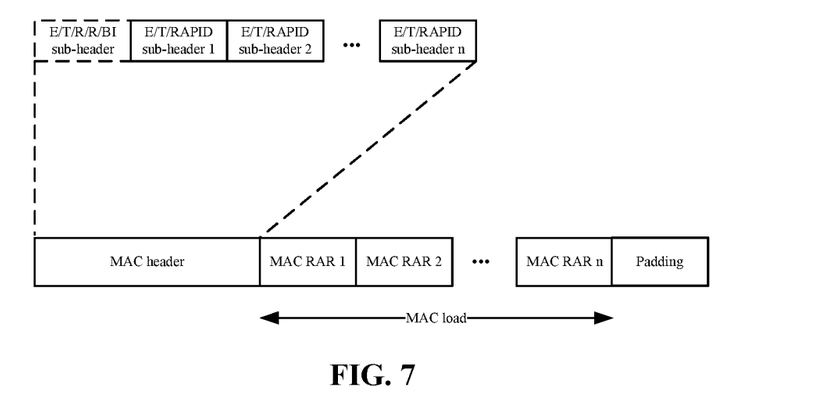
FIG. 7 is a schematic diagram of a media access control protocol data unit (MAC PDU) in the related art.

In the preceding solution, a method is that a capable UE sends an indication to the base station through an Msg1, where the indication is used for indicating that the UE intends to send the uplink data through the Msg3. After the base station receives the indication, the base station sends a greater UL grant carried in the Msg2 to the UE, and the UE may thus send to the base station the uplink data in the Msg3 by using the UL grant. The preceding method usually requires random access resources (a random access preamble, time domain resources, frequency domain resources and the like) to be divided, and part of the divided resources may correspond to requirements for a greater UL grant. The UE indicates to the base station whether the UE needs a greater UL grant in the manner of selecting different random access resources to send the Msg1, so as to carry data in the Msg3. To reduce the division of the random access resources, some manufacturers propose another solution, that is, all UEs select resources from random access resources in the same range to send the Msg1, and the base station places the UL grant of a legacy value into a media access control random access response (MAC RAR) of the Msg2 and then places a greater UL grant into a padding position in the Msg2 (an MAC PDU including the MAC RAR) structure shown in FIG. 7. This solution is referred to as a dual uplink grant. The capable UE may understand the greater UL grant information additionally carried in the padding information and use the UL grant information to send the Msg3 carrying the data.

Figure 8A:
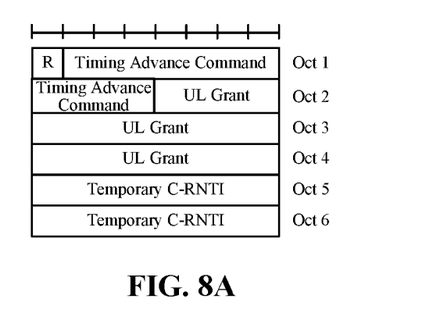
FIGS. 8(a), 8(b) and 8(c) are schematic diagrams of media access control random access response (MAC RAR) formats in the related art.
Figure 8B:
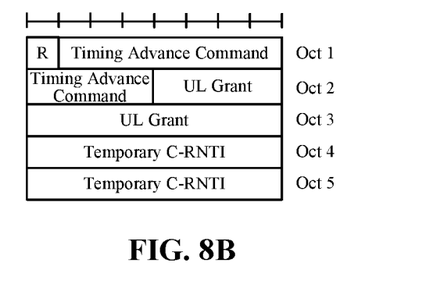
Figure 8C:
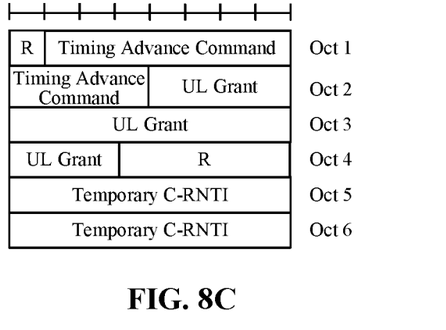

For an enhanced machine type communication (eMTC) UE, there are two types of MAC RAR formats corresponding to coverage levels, and the formats are shown in FIGS. 8(*a*) and 8(*b*). For a narrow band internet of things (NB-IoT) UE, the MAC RAR format is shown in FIG. 8(*c*).

The preceding solution is complex. The base station needs to configure two UL grants for all UEs since UEs with different capabilities (hereinafter referred to as a new version UE and an old version UE, where the new version UE has the capability of using the greater UL grant configured by the base station and the old version UE does not have the capability of using the greater UL grant configured by the base station) use the same resource to send the Msg1 and the base station cannot distinguish between the UE type. If there are more old version UEs and only a few new version UEs under the base station, then only the few UEs can use the greater UL grant configured by the base station, and for most of the remaining old version UEs, the configured greater UL grant is not used and thus leads to waste of resources.

Secondly, due to the limited bits of the padding information, if the MAC PDU includes too many MAC RARs, then the length of the padding information may be shorter than the length required for all corresponding UEs to include a greater UL grant, so the number of MAC RARs needs to be reduced in each MAC PDU. This may reduce the transmission efficiency of the Msg2 and increase a random access delay of the UE.

In summary, to allocate a greater UL grant to each UE, the number of MAC RARs that can be included at most in each MAC PDU needs to be determined in consideration of both the length of existing MAC RARs and the length of a field including a new UL grant. This also means that the length of the field including the new UL grant should be as small as possible.

In this embodiment, a new MAC RAR format (hereinafter referred to as new_MAC RAR) is defined, the base station includes the same number of new_MAC RARs as the MAC RARs before the padding position and the position sequences are the same. After the new version UE acquires the MAC RAR matched with the random access radio network temporary identifier (RA-RNTI) of the new version UE, the new version UE acquires corresponding new_MAC RARs, that is, acquires greater UL grants, according to the position sequence of the MAC RARs in the MAC PDU.

Figure 9:
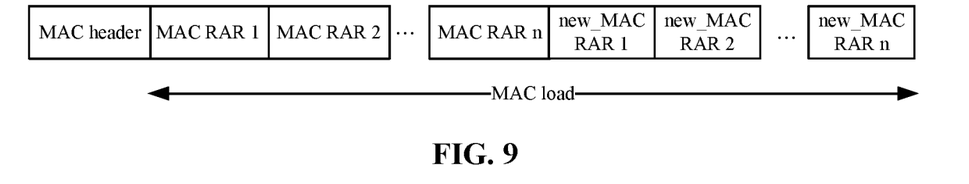
FIG. 9 is schematic diagram of an MAC PDU format according to an embodiment of the present disclosure.

As shown in FIG. 9, the MAC PDU provided by an embodiment of the present disclosure includes a media access control header (MAC header), one or more MAC RARs and new_MAC RARs in one-to-one correspondence with the one or more MAC RARs.

In an embodiment, the new_MAC RAR may include only a greater UL grant (that is, only the UL grant for uplink data transmission), or may include other newly defined information than a greater UL grant. The UL grant in the new_MAC RAR may include information similar to the UL grant in the MAC RAR, but has a greater resource length, and the granularity of resource definition may be greater to reduce the length of the new_MAC RAR as much as possible.

In another embodiment, the resource position of the UL grant included in the new_MAC RAR may completely, partially or completely not coincide with the resource position of the UL grant in the corresponding MAC RAR. In the case of complete coincidence, resources allocated to the dual uplink grant may be reduced, and the base station needs to demodulate the Msg3 at the same position by using different resource lengths.

An embodiment of the present disclosure provides a data transmission method, and the data transmission method includes the steps described below.

The UE send the random access preamble to the base station.

The UE receives a random access response sent by the base station. The random access response carries the media access control protocol data unit, and the media access control protocol data unit includes the media access control header, one or more media access control random access responses and one or more new media access control random access responses in one-to-one correspondence with the one or more media access control random access responses. Each new media access control random access response carries uplink grant information for the uplink data transmission, and the resource position of the uplink grant information carried in each new media access control random access response at least partially coincides with the resource position of the uplink grant information carried in the corresponding media access control random access response.

After the UE obtains the matched media access control random access response according to the random access radio network temporary identifier, the UE obtains the new media access control random access response corresponding to the matched media access control random access response and obtains an uplink grant from the new media access control random access response.

The UE uses the uplink grant to send the first request message carrying the uplink data.

An embodiment of the present disclosure provides a data transmission method, and the data transmission method includes the steps described below.

The base station receives the random access preamble sent by the UE.

The base station sends the random access response to the UE. The random access response carries the media access control protocol data unit, the media access control protocol data unit includes the media access control header, one or more media access control random access responses and one or more new media access control random access responses in one-to-one correspondence with the one or more media access control random access responses. Each new media access control random access response carries the uplink grant information for the uplink data transmission, and the resource position of the uplink grant information carried in each new media access control random access response at least partially overlaps with the resource position of the uplink grant information carried in the corresponding media access control random access response.

The base station receives the first request message carrying the uplink data and sent by the UE.

An embodiment of the present disclosure provides a data transmission apparatus. The apparatus includes a memory and a processor, where the memory stores a program and the program, when read and executed by the processor, performs the data transmission method described in any one of the preceding embodiments.

Figure 10:
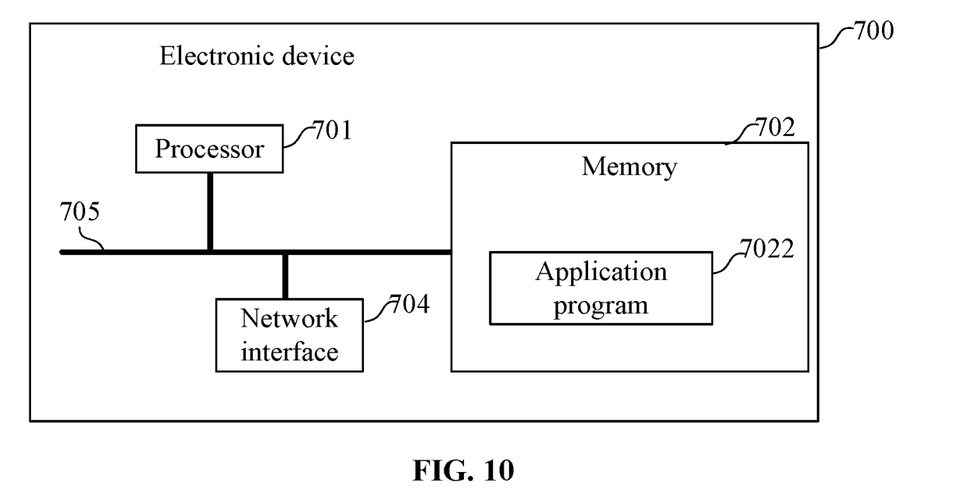
FIG. 10 is a structural diagram of hardware of an electronic device according to an embodiment of the present disclosure.

FIG. 10 is a structural diagram of hardware of an electronic device (a data transmission apparatus or a search space optimization apparatus) according to an embodiment of the present disclosure. The electronic device 700 includes at least one processor 701, a memory 702 and at least one network interface 704. Various components in the electronic device 700 are coupled together via a bus system 705. It may be understood that the bus system 705 is configured to implement connections and communications between these components. Excluding a data bus, the bus system 705 further includes a power bus, a control bus and a state signal bus. However, for the sake of clarity, various buses are all marked as the bus system 705 in FIG. 10.

It may be understood that the memory 702 may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic disk memory or a magnetic tape memory. The volatile memory may be a random access memory (RAM), which serves as an external cache. By way of an illustrative description rather than a limited description, many forms of RAMs may be used, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM) and a direct Rambus random access memory (DRRAM). The memory 702 described in the embodiment of the present disclosure is intended to include, but is not limited to, these memories and any other suitable type of memory.

The memory 702 in this embodiment of the present disclosure is configured to store various types of data to support operations of the electronic device 700. Examples of the various types of data include any computer program, such as an application program 7022, operated on the electronic device 700. Programs for implementing the methods in the embodiments of the present disclosure may be included in the application program 7022.

The methods disclosed by the embodiments of the present disclosure may be applied to the processor 701 or may be performed by the processor 701. The processor 701 may be an integrated circuit chip with a signal processing capability. In the implementation process, various steps of the preceding methods may be performed by an integrated logic circuit of hardware or a software instruction in the processor 701. The preceding processor 701 may be a general-purpose processor, a digital signal processor (DSP), or another programmable logic device, another discrete gate or transistor logic device, another discrete hardware component or the like. The processor 701 may implement or execute various methods, steps and logic block diagrams disclosed by the embodiments of the present disclosure. The general-purpose processor may be a microprocessor or any conventional processor. The steps of the methods disclosed by the embodiments of the present disclosure may be performed by a hardware decoding processor, or may be performed by a combination of hardware and software modules in the decoding processor. The software module may be located in a storage medium and the storage medium is located in the memory 702. The processor 701 reads information in the memory 702 and implements the steps of the preceding methods in combination with hardware of the processor 701.

In an exemplary embodiment, the electronic device 700 may be performed by one or more application specific integrated circuits (ASICs), DSPs, programmable logic devices (PLDs), complex programmable logic devices (CPLDs), field-programmable gate arrays (FPGAs), general-purpose processors, controllers, micro controller units (MCUs), micro processor units (MPUs) or other electronic elements to perform the preceding methods.

An embodiment of the present disclosure provides a storage medium. The storage medium stores one or more programs executable by one or more processors so that the data transmission method executed by the UE or the data transmission method and the search space optimization method executed by the base station in any one of the preceding embodiments are performed.

Although the embodiments disclosed by the present disclosure are as described above, the content thereof is merely embodiments for facilitating the understanding of the present disclosure and is not intended to limit the present disclosure. Those skilled in the art to which the present disclosure pertains may make any modifications and changes on implementation forms and details without departing from the spirit and scope disclosed by the present disclosure, but the protection scope of the present disclosure is still subject to the scope defined by the appended claims.

What is claimed is:

1. A data transmission method, comprising:
    sending, by a user equipment (UE), a random access preamble to a base station, and receiving, by the UE, a first response message sent by the base station, wherein the first response message is a random access response;
    sending, by the UE, a first request message to the base station; and
    receiving, by the UE in a first state, an uplink grant sent by the base station, and sending, by the UE, uplink data to the base station by using the uplink grant, wherein the first state comprises an idle state or an inactive state;
    wherein in a case where the UE receives, before the UE receives the uplink grant sent by the base station, a second response message returned by the base station, after the UE determines that conflict resolution is successful according to the second response message, the UE remains in the first state and uses a temporary cell radio network temporary identifier as a cell radio network temporary identifier, wherein the temporary cell radio network temporary identifier is allocated by the base station and carried in the random access response.

2. The data transmission method of claim 1, wherein the first request message carries at least one of:
    an indication about whether to switch a state, an indication that the uplink data is to be sent, or an indication about whether to support a data transmission function in the first state.

3. The data transmission method of claim 1, wherein sending, by the UE, the uplink data to the base station by using the uplink grant comprises:
    in response to determining that the uplink data sent by the UE by using the uplink grant is a last uplink data packet to be sent by the UE, carrying an indication that no data to be sent exists in the uplink data when the UE sends the uplink data.

4. The data transmission method of claim 1, wherein the second response message comprises at least one of resource configuration information or search space configuration information of the uplink grant corresponding to the uplink data detected by the UE.

5. The data transmission method of claim 4, further comprising:
    detecting, by the UE, at least one of the uplink grant or a downlink grant according to at least one of the received resource configuration information or the received search space configuration information of the uplink grant.

6. The data transmission method of claim 1, further comprising after the UE confirms that the base station receives a last uplink data packet sent by the UE, releasing, by the UE, the cell radio network temporary identifier.

7. The data transmission method of claim 1, further comprising after the UE confirms that the base station receives a last uplink data packet sent by the UE, in a case where the UE is monitoring a common search space having a shorter monitoring interval, switching, by the UE, back to a common search space having a longer monitoring interval.

8. The data transmission method of claim 6, wherein the UE confirms, according to at least one of the following conditions, that the base station receives the last uplink data packet sent by the UE:
    the UE fails to receive a uplink grant for retransmission sent by the base station within a preset time; or
    the UE receives information about acknowledge receipt of the last uplink data packet sent by the UE, wherein the information is sent by the base station.

9. The data transmission method of claim 1, wherein sending, by the UE, the uplink data, to the base station by using the uplink grant comprises:
    determining, by the UE, whether the uplink grant is used for new transmission or retransmission; in response to determine that the uplink grant is used for the new transmission, using, by the UE, the uplink grant to send new uplink data to be transmitted;
    and in response to determine that the uplink grant is used for the retransmission, using, by the UE, the uplink grant to retransmit uplink data sent before.

10. The data transmission method of claim 9, wherein the UE determines, in one of the following manners, whether the uplink grant is used for the new transmission or the retransmission:
    determining, according to a new physical-layer format indication used when the base station sends the uplink grant, whether the uplink grant is used for the new transmission or the retransmission; or
    determining, according to indication information carried when the base station sends the uplink grant, whether the uplink grant is used for the new transmission or the retransmission.

11. A data transmission apparatus, comprising a memory and a processor, wherein the memory stores a program, and the program, when read and executed by the processor, performs the data transmission method of claim 1.

12. A non-transitory storage medium, which stores one or more programs, wherein the one or more programs are executable by one or more processors to perform the data transmission method of claim 1.

13. A data transmission method, comprising:
    receiving, by a base station, a random access preamble sent by a UE, and sending, by the base station, a first response message to the UE, wherein the first response message is a random access response and carries a temporary cell radio network temporary identifier allocated by the base station;
    receiving, by the base station, a first request message sent by the UE; and
    sending, by the base station, an uplink grant to the UE in a first state, and receiving, by the base station, uplink data sent by the UE by using the uplink grant, wherein the first state comprises an idle state or an inactive state;
    wherein in a case where the base station sends, before the base station sends the uplink grant to the UE in the first state, a second response message to the UE, wherein the UE determines that conflict resolution is successful according to the second response message, remains in the first state and uses the temporary cell radio network temporary identifier as a cell radio network temporary identifier.

14. A data transmission apparatus, comprising a memory and a processor, wherein the memory stores a program and the program, when read and executed by the processor, performs the data transmission method of claim 13.

15. A non-transitory storage medium, which stores one or more programs, wherein the one or more programs are executable by one or more processors to perform the data transmission method of claim 13.

* * * * *